(12) United States Patent
Weng et al.

(10) Patent No.: US 7,367,199 B2
(45) Date of Patent: May 6, 2008

(54) METHOD FOR AUTOMATICALLY BALANCING AIR CONDITIONING OUTDOOR HEAT EXCHANGE

(75) Inventors: Kuo-Liang Weng, Taichung Hsien (TW); Jing-Ru Weng, Taichung Hsien (TW)

(73) Assignee: Cohand Technology Co., Ltd., Taichung Hsien (TW)

( * ) Notice: Subject to any disclaimer, the term of this patent is extended or adjusted under 35 U.S.C. 154(b) by 496 days.

(21) Appl. No.: 11/055,681

(22) Filed: Feb. 11, 2005

(65) Prior Publication Data

US 2006/0179857 A1 Aug. 17, 2006

(51) Int. Cl.
*F25B 29/00* (2006.01)
*F25D 17/00* (2006.01)

(52) U.S. Cl. .................. 62/159; 62/181; 62/183; 62/186

(58) Field of Classification Search .............. 62/159, 62/160, 181, 183, 186; 236/49.3
See application file for complete search history.

(56) References Cited

U.S. PATENT DOCUMENTS

2004/0238653 A1* 12/2004 Alles .................. 236/49.3

\* cited by examiner

*Primary Examiner*—Marc Norman
(74) *Attorney, Agent, or Firm*—Troxell Law Office PLLC

(57) ABSTRACT

A method for automatically balancing air conditioning outdoor heat exchange detects a piping measured value of each piping equipment through a detection unit and compares the piping measured value with a set operation mode selected by users and a set value. Airflow amount of adjustable air vents is adjustable according to the comparing result. The method includes the steps of: (1) selecting an operation mode, (2) selecting an effective piping measured value which serves as the basis to operate an air fan device, and (3) based on the piping measured value corresponding to each exchange equipment to open the air vents at a desired degree. By means of the aforesaid method and system, the air conditioning outdoor heat exchange system can be balanced automatically.

15 Claims, 11 Drawing Sheets

METHOD FOR AUTOMATICALLY BALANCING AIR CONDITIONING OUTDOOR HEAT EXCHANGE

BACKGROUND OF THE INVENTION

1. Field of the Invention

The invention relates to a method for automatically balancing air conditioning outdoor heat exchange to improve total system operation efficiency and automatically balance operation of air conditioning outdoor heat exchange systems to maintain an automatic balance condition and save energy.

2. Description of the Prior Art

Nowadays installation of an air conditioning system has to take into account of indoor configuration, aesthetic appealing, silence and saving space. Hence many air conditioning equipment and piping are installed outdoors to become an outdoor heat exchange equipment. To further reduce space and cost, a plurality of outdoor heat exchange equipment could share one or more set of air fan device F. Through operation of the air fan device F, outdoor air is channeled through the piping arrays A and A' of the outdoor heat exchange equipment to maintain system stability thereof (referring to FIG. 1). However, the aforesaid conventional outdoor heat exchange equipment has disadvantages when in use, notably:

To save space and cost, usually multiple sets of outdoor heat exchange equipment are arranged to share one or more set of air fan device F. As each of the heat exchange equipment is not necessary located on the same side of the case, airflow direction entering each heat exchange equipment could coincide with the wind direction or against the wind direction. For the equipment located in the wind direction, airflow amount generally is much greater than the normal condition, hence the efficiency of the heat exchange equipment is higher. But excessive airflow could also result in dropping of the efficiency. For instance, for generating a cooling condition, excessive condensing could happen; and for generating a heating condition, overloading could occur. On the other hand, if the heat exchange equipment is located against the wind direction, external air is more difficult to enter, and airflow could be not adequate. With the air fan device F running in the same condition, the operation efficiency varies significantly because of different installed locations of the heat exchange equipment. This is especially severe to the equipment that are against the wind direction. Inadequate airflow results in decreased efficiency, and the operation efficiency of the entire system suffers.

Moreover, for the outdoor heat exchange equipment that consists of multiple sets, if the airflow demand for the equipment on one side is smaller, or only part of the equipment is operating, the air fan device F does not automatically regulate to a more efficient operation mode. Unnecessary waste of operation cost occurs.

SUMMARY OF THE INVENTION

In view of the aforesaid problems occurred to the conventional outdoor heat exchange equipment with the air fan device F not capable of regulating airflow and rotation speed according to the installed location of the heat exchange equipment and actual requirements, the present invention aims to provide a method for automatically balancing air conditioning outdoor heat exchange. The method includes the steps of: (1) selecting an operation mode, (2) selecting an effective piping measured value which serves as the basis to operate the air fan device, and (3) based on the piping measured value corresponding to each exchange equipment to open air vents at a desired degree. Based on the procedures set forth above, operation efficiency of various outdoor heat exchange equipment varies because of different installed locations. Hence the efficiency of the entire system may be improved to save energy, and optimum airflow may be generated to meet users' requirements.

The foregoing, as well as additional objects, features and advantages of the invention will be more readily apparent from the following detailed description, which proceeds with reference to the accompanying drawings.

DESCRIPTION OF THE PREFERRED EMBODIMENTS

Figure 1:
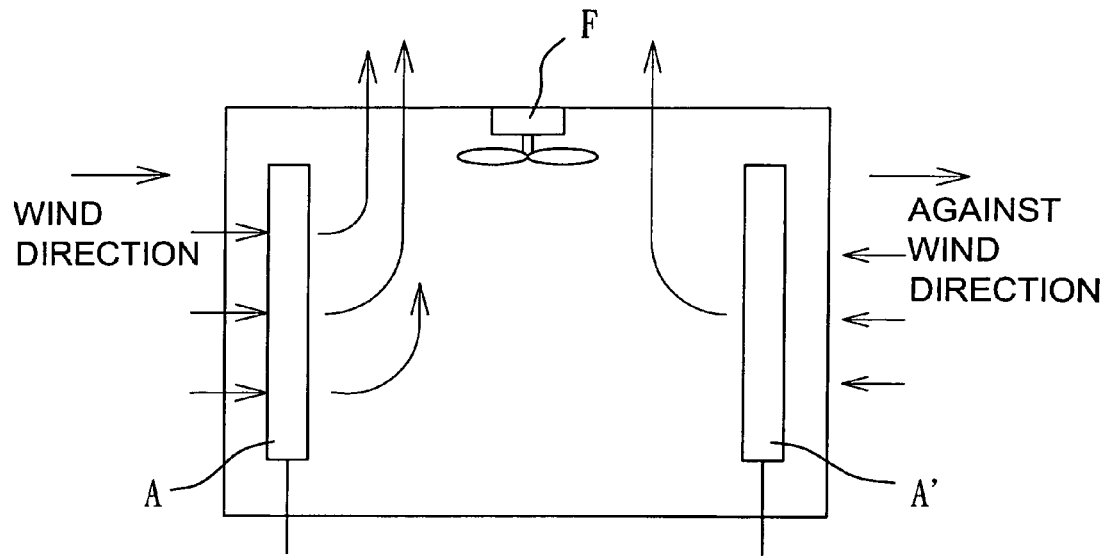
FIG. 1 is a schematic view of a conventional air conditioning outdoor heat exchange system.
Figure 2:
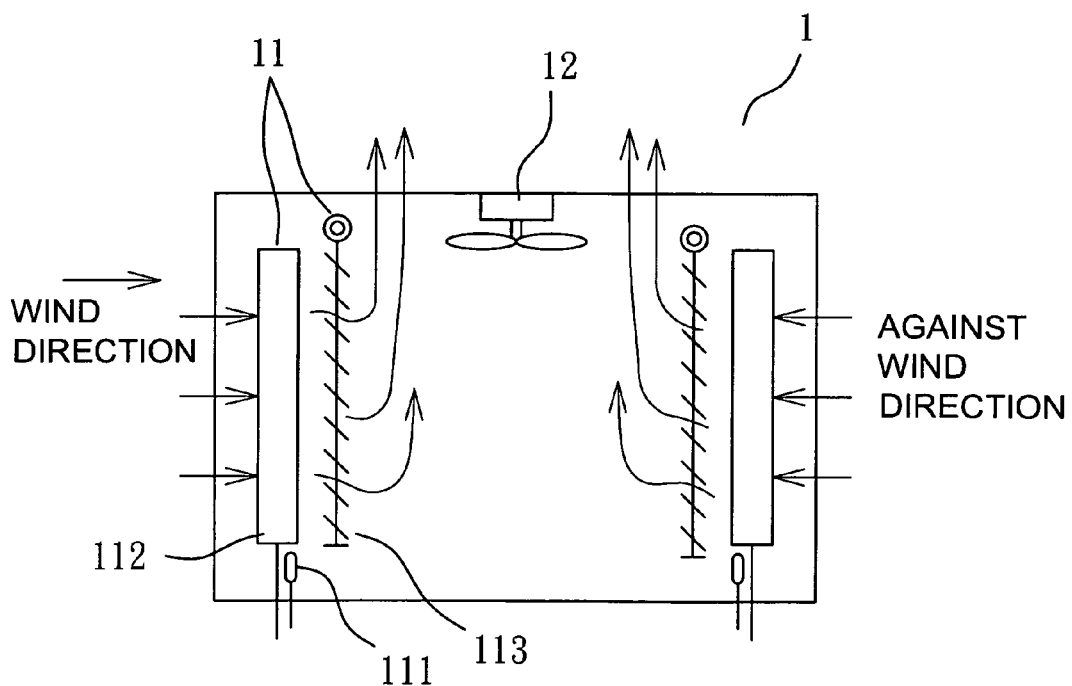
FIG. 2 is a schematic view of the air conditioning outdoor heat exchange system of the invention.
Figure 3:
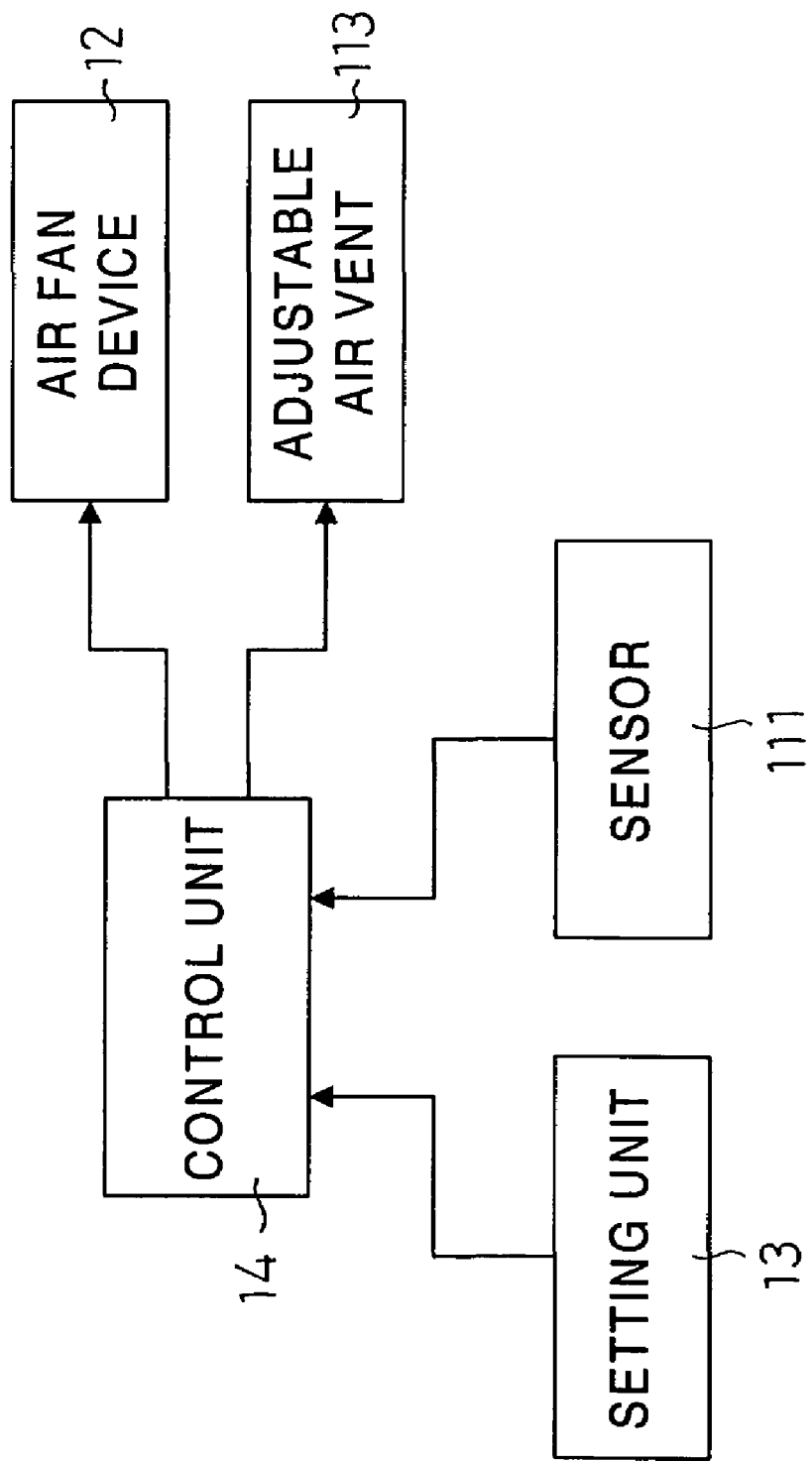
FIG. 3 is a system block diagram of the invention.

The present invention provides is an automatically balancing system 1 for air conditioning outdoor heat exchange equipment (referring to FIGS. 2 and 3). It includes:

a control unit 14 which calculates total requirement based on a comparison result between a detected piping measured value TC (which may be a temperature measured value or a pressure measured value, or a combination of temperature and pressure measured value) and a set value TCS to control the rotation speed of an air fan device 12 and the opening degree of an adjustable air vent 113;

a setting unit 13 to input the set value TCS (may be a temperature set value or a pressure se value, and generally is carried out by technicians) of each outdoor heat exchange equipment, and select the operation mode of the equipment to be cooling or heating (may be performed by users, the operation mode may further include selection and control of activation and stop). The setting unit 13 may be an operation panel, or performed through a network monitoring approach;

an air fan device 12 which receives control commands from the control unit 14, and adjusts rotation speed according to the setting of the setting unit 13; and at least one outdoor heat exchange equipment (abbreviated equipment hereinafter) 11, each includes:

a detection unit 111 to detect the piping measured value TC of the corresponding equipment; and an adjustable air vent 113 to receive commands of the control unit 14 to adjust the opening degree of the adjustable air vent 113 to control intake of external airflow.

Figure 12:
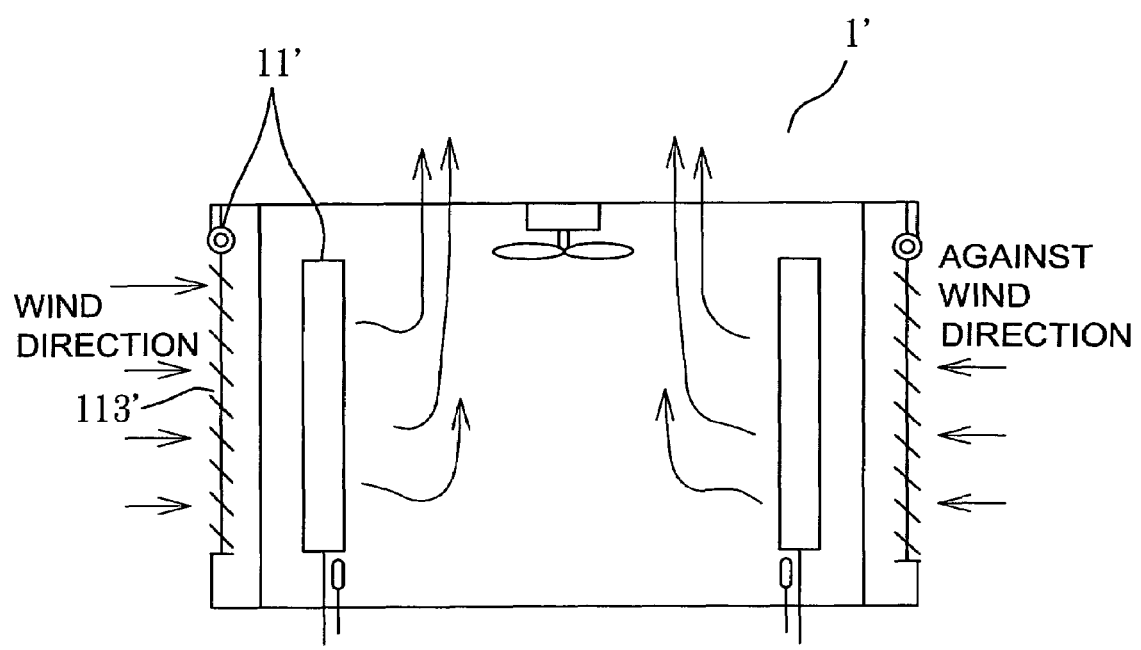
FIG. 12 is a system block diagram of another embodiment of the invention.

Refer to FIG. 12 for the system block diagram of another embodiment of the invention. The automatically balancing system 1' for air conditioning outdoor heat exchange equipment includes an adjustable air vent 113' which is located on an outer side of the equipment to meet different installation requirements.

Figure 4:
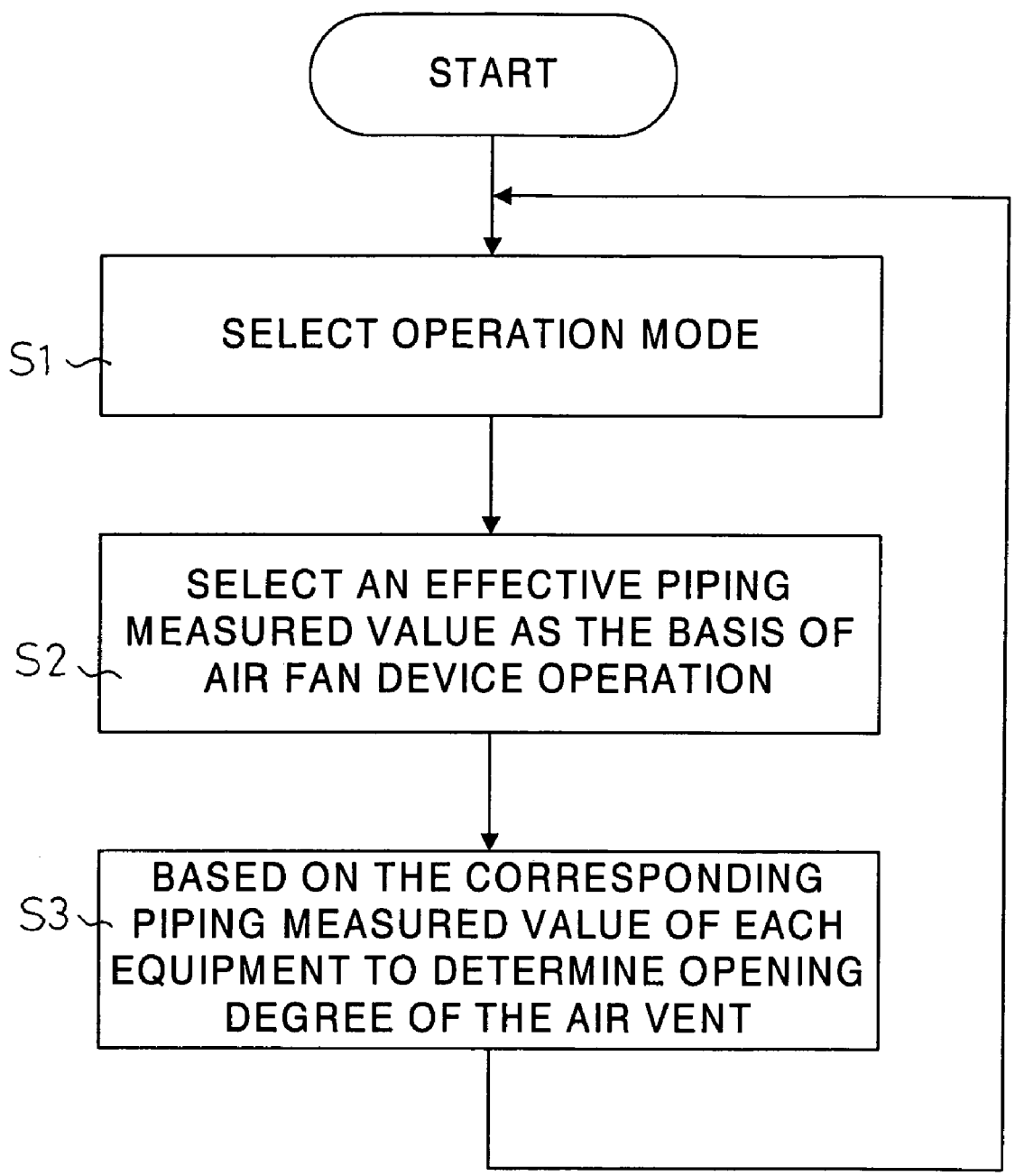
FIG. 4 is the main process flow chart of the invention

Based on the automatically balancing system 1 for air conditioning outdoor heat exchange equipment set forth above, the piping measured value TC of each piping array 112 and the operation mode selected and set by users are obtained to enable the control unit 14 to control opening degree of the adjustable air vent 113 and the rotation speed of the air fan device 12. The method includes the steps as follow (referring to FIG. 4):

Selecting an operation mode (step S1): users select the operation mode (cooling or heating) of the air conditioning system through the setting unit 13;

Selecting an effective piping measured value as the basis for air fan device operation (step S2): the detection unit 111 detects the piping measured value of the piping array 112 of each outdoor heat exchange equipment, and compare the selected effective piping measured value TC with a set value TCS to adjust the rotation speed of the air fan device 12; and Based on the piping measured value TC corresponding to each equipment to open the air vent at a desired degree (step S3): compare the piping measured value TC corresponding to each equipment with the set value TCS, and based on the compared result to adjust the opening degree of each corresponding adjustable air vent 113.

Figure 5:
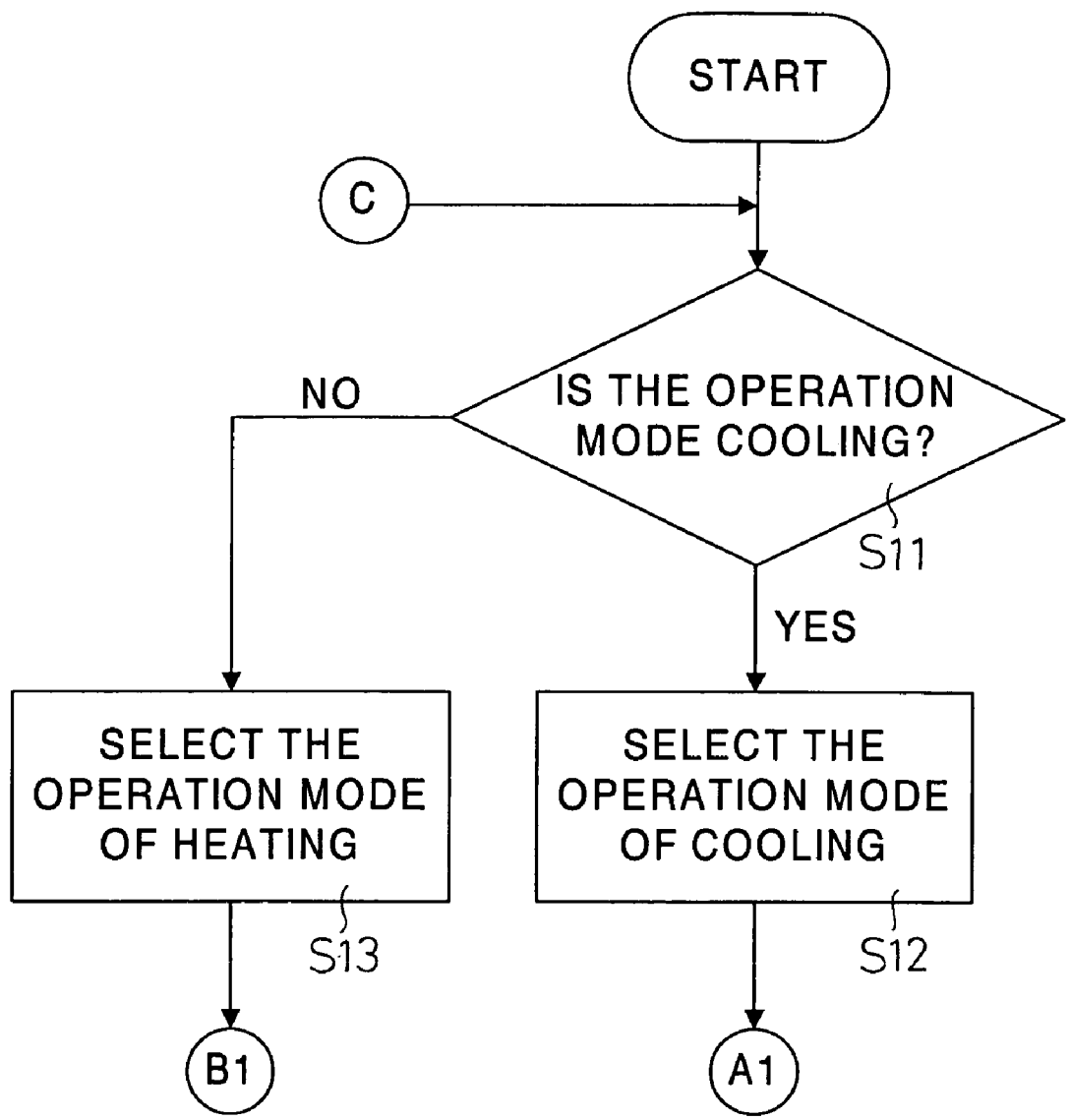
FIG. 5 is the sub-flow chart of step S1 of the invention.
Figure 6:
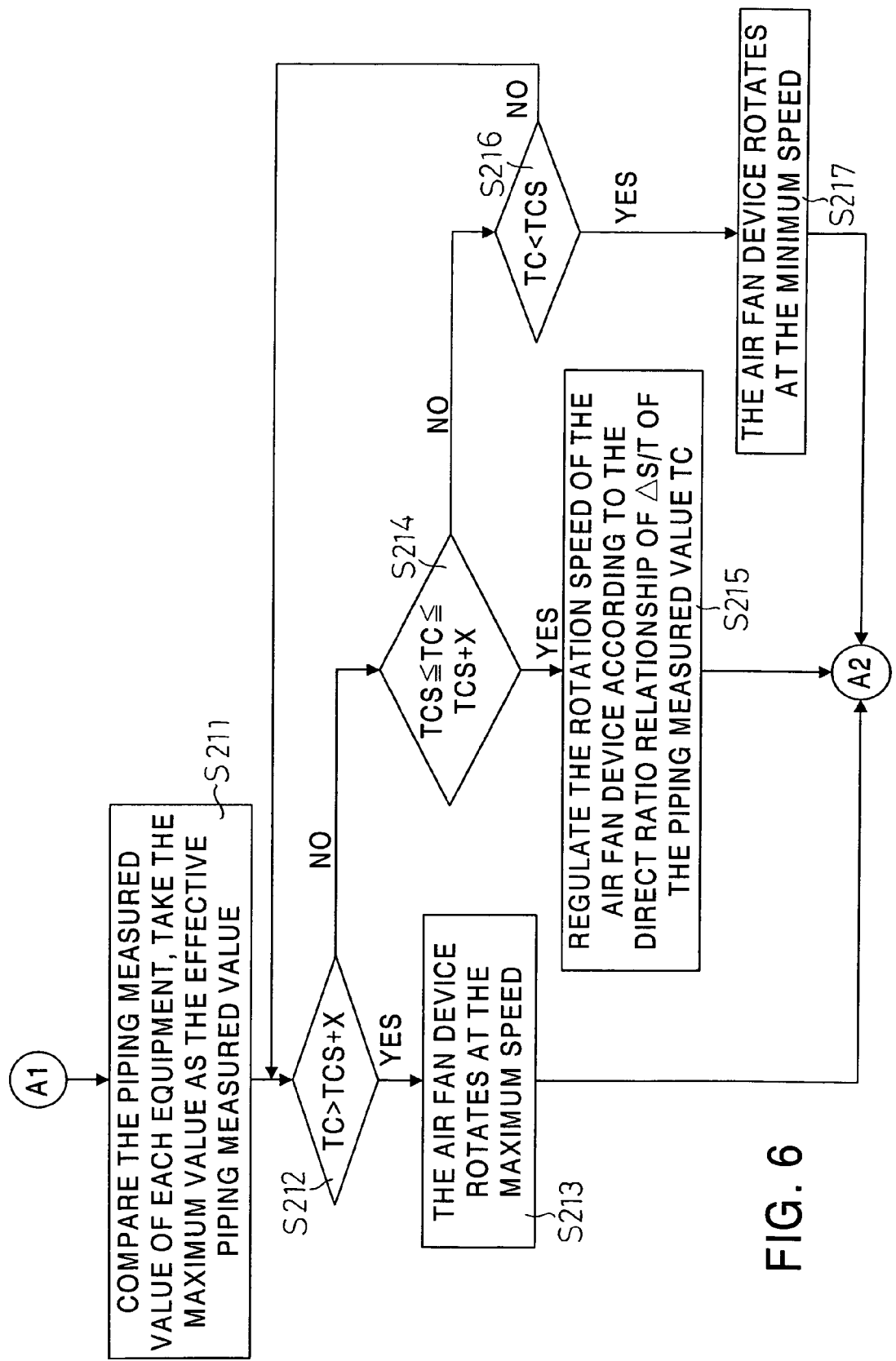
FIG. 6 is the sub-flow chart of step S21 of the invention.

Referring to FIG. 5, at step S1, actual execution is based on the operation mode selected by users according to requirements. Select the operation mode through the setting unit 13 (step S11) to be a cooling operation mode (step S12) or a heating operation mode (step S13) to enable the control unit 14 to do determination Referring to FIG. 6, at step S2, when the cooling operation mode is selected (step S12), the piping measured value of each piping array 112 is detected by the detection unit 111 located thereon. The maximum value is used as the effective piping measured value TC (step S211) which is served as the basis for the operation of the air fan device 12. The relationship between the rotation speed of the air fan device 12 and the effective piping measured value TC is as follow:

(1) when TC>TCS+X, namely the piping measured value TC is greater than the sum of the set value TCS and a set variation value X, the air fan device 12 rotates at the maximum speed (steps S212, S213); otherwise, execute process flow (2);

(2) when TCS≦TC≦TCS+X, the rotation speed of the air fan device 12 is regulated according to a direct ratio relationship with the value of ΔS/T of the piping measured value TC (steps S214, S215; ΔS/T is the ratio of variation ΔS of the piping measured value TC in a unit time T); otherwise, execute process flow (3);

(3) When TC<TCS, the air fan device 12 rotates at the minimum speed (steps S216, S217).

Figure 7:
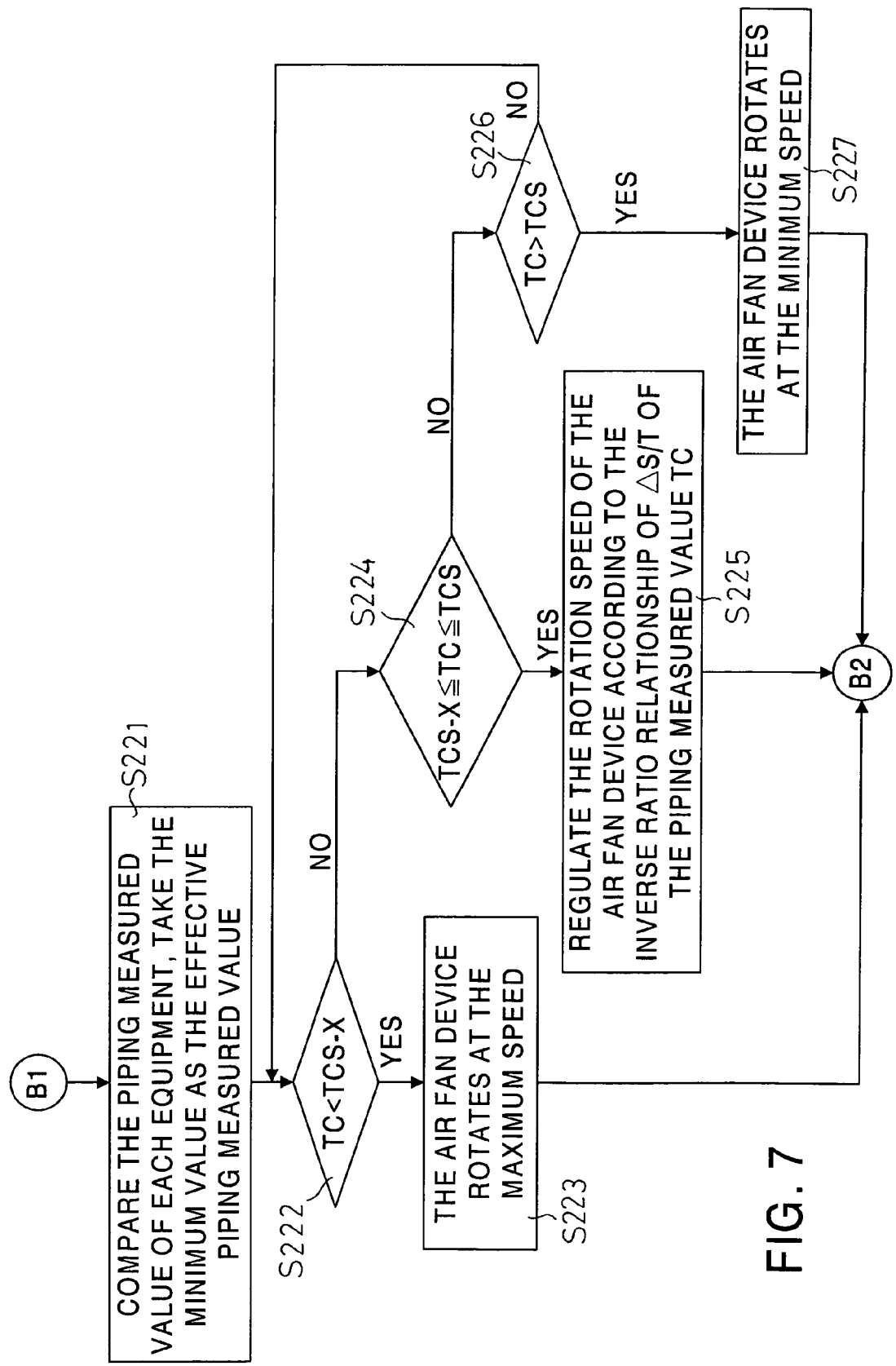
FIG. 7 is the sub-flow chart of step S22 of the invention.

Referring to FIG. 7, at step S2, when the heating operation mode is selected (step S13), the piping measured value of each piping array 112 is detected by the detection unit 111 located thereon. The minimum value is used as the effective piping measured value TC (step S221) which is served as the basis for the operation of the air fan device 12. The relationship between the rotation speed of the air fan device 12 and the effective piping measured value TC is as follow:

(1) when TC<TCS−X, the air fan device 12 rotates at the maximum speed (steps S222, S223); otherwise, execute process flow (2);

(2) when TCS−X≦TC≦TCS, the rotation speed of the air fan device 12 is regulated according to an inverse ratio relationship with the value of ΔS/T of the piping measured value TC (steps S224, S225); otherwise, execute process flow (3);

(3) When TC>TCS, the air fan device 12 rotates at the minimum speed (steps S226, S227).

Figure 8:
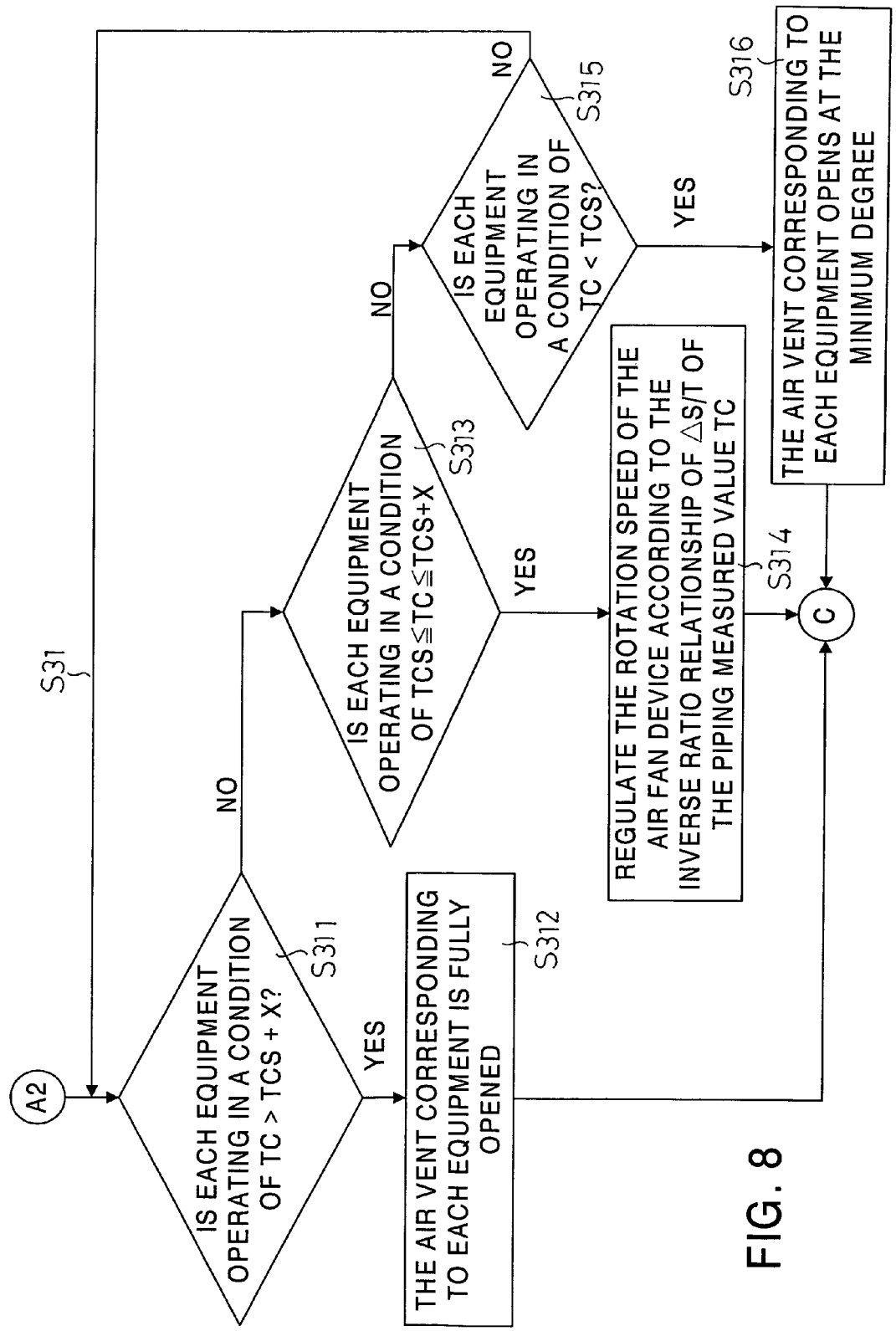
FIG. 8 is the sub-flow chart of step S31 of the invention.
Figure 10:
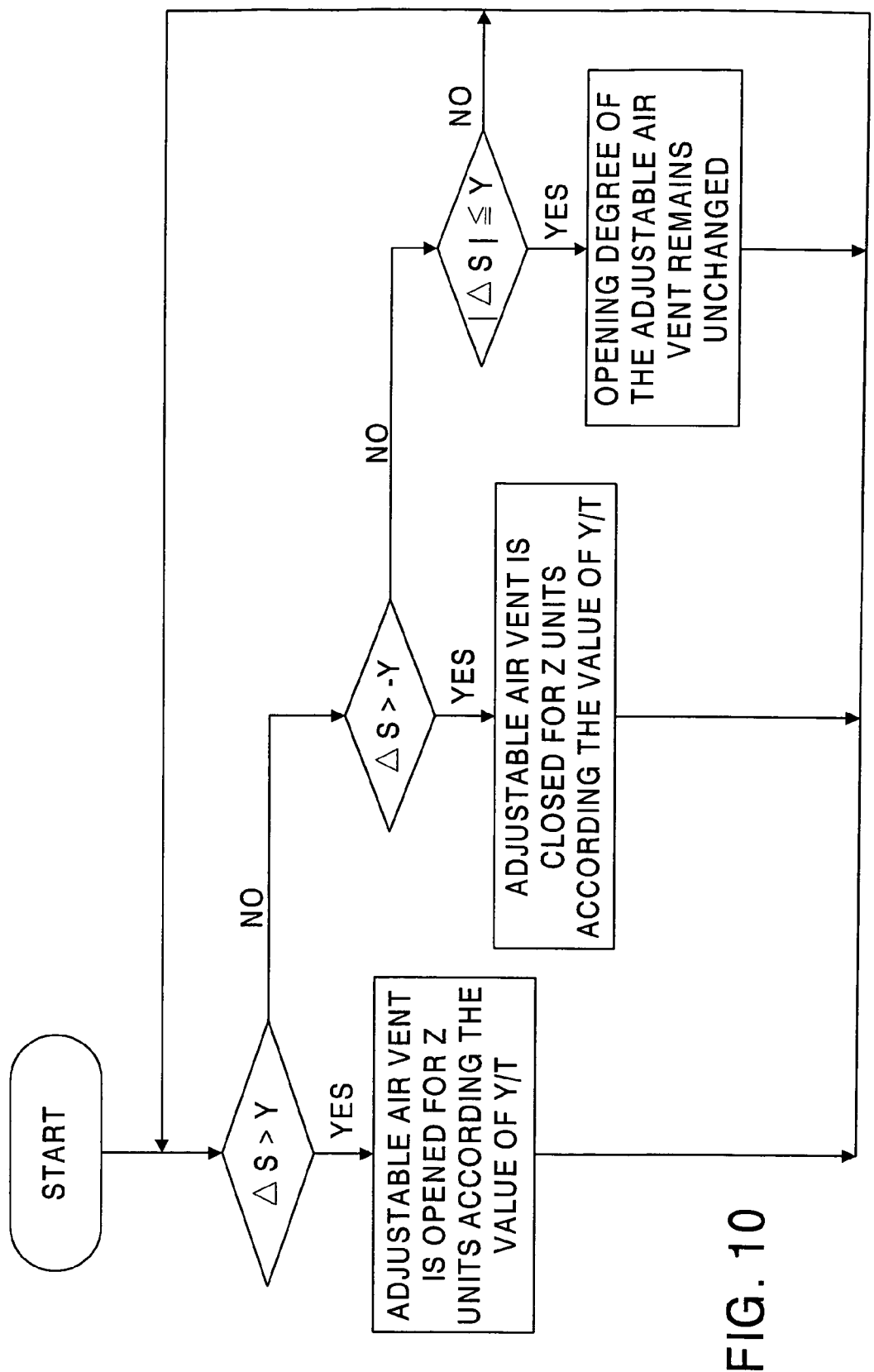
FIG. 10 is the sub-flow chart of step S314 of the invention.

Referring to FIG. 8, at step S3, when the equipment is in the cooling operation mode, the adjustable air vent 113 of each equipment is adjusted and opened according to the following procedures (step S31):

1. Start.
2. When each equipment is in an operation condition of TC>TCS+X (step S311), the control unit 14 outputs a command to order the adjustable air vent 113 corresponding to each equipment to open at the maximum degree (step S312); otherwise, execute step S313 (for other equipment that are not operating, their adjustable air vents are closed).
3. When each equipment is in an operation condition of TC>TCS+X (Step S313), the control unit 14 outputs a command to order the adjustable air vent 113 corresponding to each equipment to open at a degree according to the direct ratio relationship of the variation value ΔS of the piping measured value TC and the unit time T (step S314), and regulating the opening of the adjustable air vent 113 is executed according to the following procedures (referring to FIG. 10):
   (1) when ΔS>Y, (Y represents a set variation value), namely the variation ΔS of the piping measured value TC is greater than the set variation value Y, the adjustable air vent 113 corresponding to the equipment is opened for z units according to the ratio of Y/T (z represents the moving degree of the adjustable air vent), and comparison and moving are executed anew for each unit time T;
   (2) when ΔS<−Y, the adjustable air vent 113 corresponding to the equipment is closed for z units according to the ratio of Y/T, and comparison and moving are executed anew for each unit time T; and
   (3) when |ΔS|≦Y, the adjustable air vent 113 corresponding to the equipment maintains unchanged, and comparison and moving are executed anew for each unit time T.

When each equipment is in an operation condition of TC<TCS (step S315), the control unit 14 outputs a command to order the adjustable air vent 113 corresponding to each equipment to open at the minimum degree (step 316).

Figure 9:
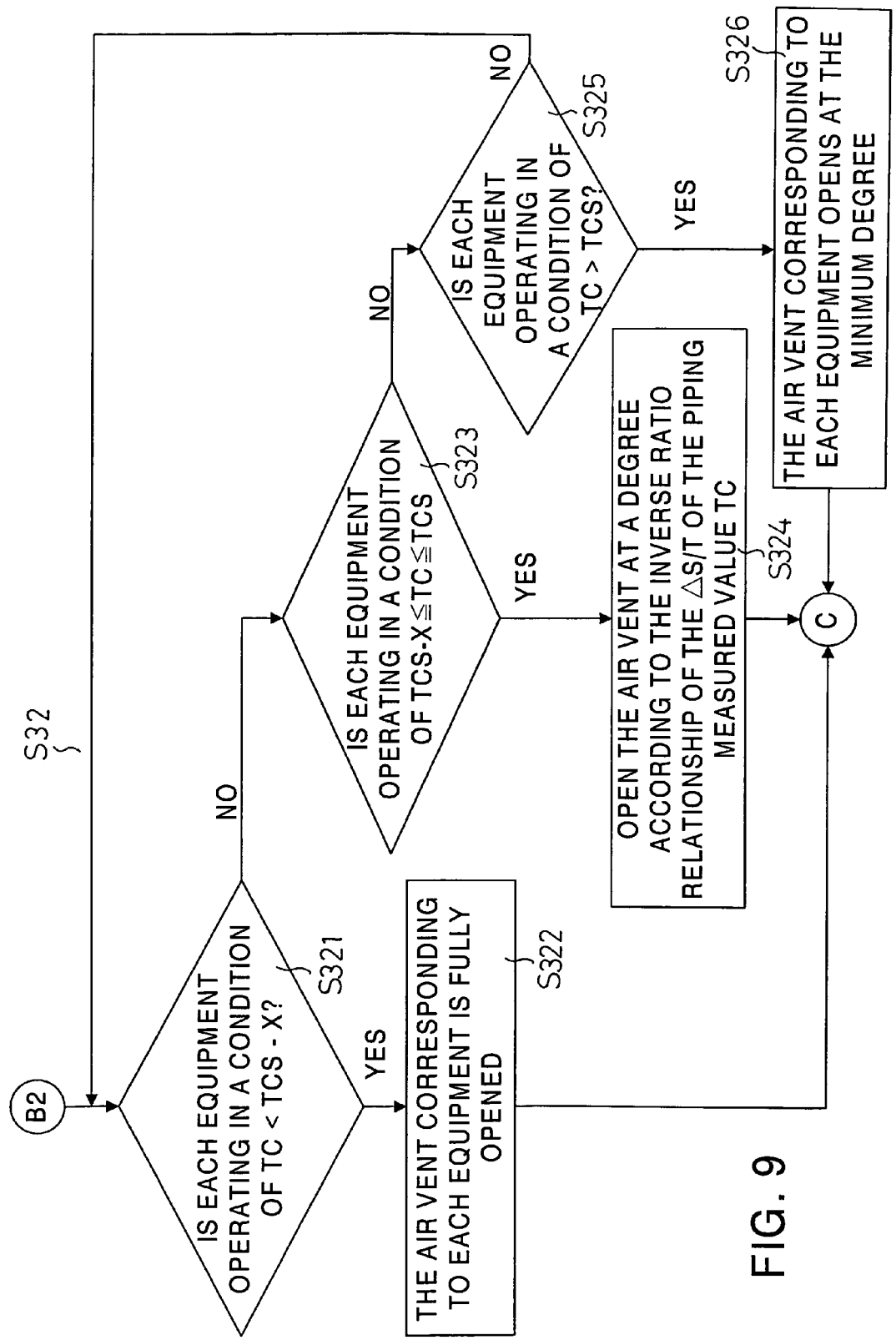
FIG. 9 is the sub-flow chart of step S32 of the invention.
Figure 11:
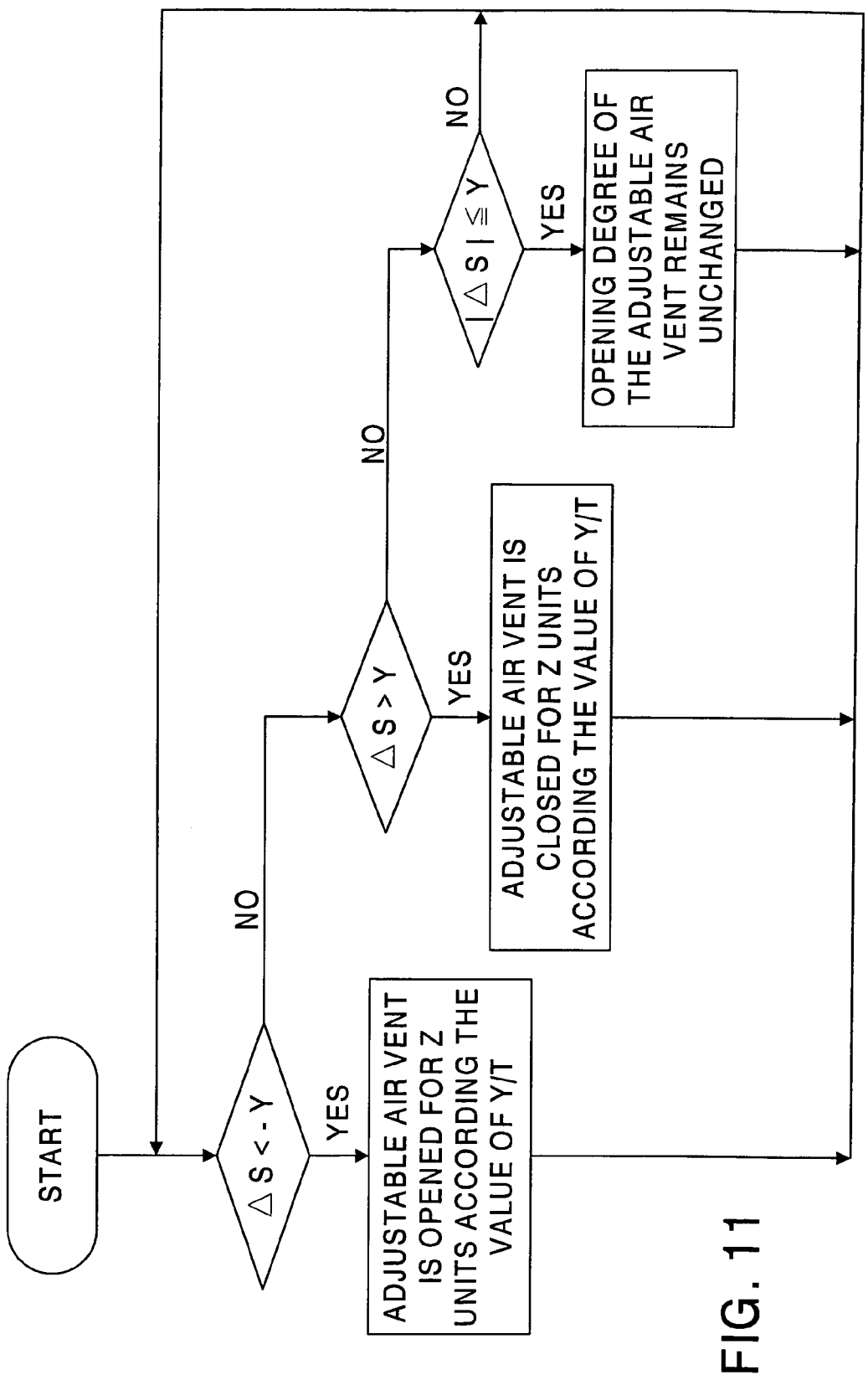
FIG. 11 is the sub-flow chart of step S324 of the invention.

Refer to FIG. 9, at step S3, when the operation mode of the equipment is heating, the air vent 113 is adjusted and opened according to the following procedures (step S32):

1. Start.
2. When each equipment is in an operation condition of TC<TCS−X (step 321), the control unit 14 outputs a command to order the adjustable air vent 113 corresponding to each equipment to open at the maximum degree (step S322); otherwise, execute step S323 (for other equipment that are not operating, their adjustable air vents are closed).
3. When each equipment is in an operation condition of TCS−X≦T C≦TCS (step S323), the control unit 14 outputs a command to order the adjustable air vent 113 corresponding to each equipment to open at a degree according to the inverse ratio relationship of the variation value of ΔS of the piping measured value TC and the unit time T (step S324), and regulating the opening of the adjustable air vent 113 is executed according to the following procedures (referring to FIG. 11):

(1) when ΔS<−Y, the adjustable air vent 113 corresponding to the equipment is opened for z units according to the ratio of Y/T, and comparison and moving are executed anew for each unit time T;

(2) when ΔS>Y, the adjustable air vent 113 corresponding to the equipment is closed for z units according to the ratio of Y/T, and comparison and moving are executed anew for each unit time T; and (3) when |ΔS|≦Y, the adjustable air vent 113 corresponding to the equipment maintains unchanged, and comparison and moving are executed anew for each unit time T.

4. When each equipment is in an operating condition of TC>TCS (step S325), the control unit 14 outputs a command to order the adjustable air vent 113 corresponding to each equipment to open at the minimum degree (step 326).

We claim:

1. A method for automatically balancing air conditioning outdoor heat exchange in an outdoor heat exchange equipment, comprising the steps of:
   (1) selecting an operation mode comprising the steps of users selecting the operation mode of an air conditioning system through a setting unit;
   (2) operating an air fan device based on selection of an effective piping measured value comprising the steps of detecting a piping measured value of the outdoor heat exchange equipment through a detection unit and selecting the effective piping measured value and comparing the effective piping measured value with a set value adjusting rotation speed of the air fan device based on the comparing result; and
   (3) opening an air vent at a selected degree based on the piping measured value corresponding to the equipment comprising the steps of adjusting the opening degree of the corresponding adjustable air vent according to the comparing result of the piping measured value corresponding to the equipment with the set value.

2. The method of claim 1, wherein the effective piping measured value is a maximum piping measured value corresponding to the equipment to serve as the basis for operation of the air fan device when the operation mode is cooling.

3. The method of claim 2, wherein the corresponding adjustable air vent is fully opened when the corresponding piping measured value of the equipment is greater than the sum of the set value and a set variation value.

4. The method of claim 2, wherein the corresponding adjustable air vent is adjusted and opened according to a direct ratio relationship with a value between a piping measured value variation and a unit time when the piping measured value corresponding to the equipment is smaller than or equals to the sum of the set value and a set variation value.

5. The method of claim 2, wherein the corresponding adjustable air vent opens at a minimum degree when the piping measured value corresponding to the equipment is smaller than the set value.

6. The method of claim 2, wherein the air fan device rotates at a maximum speed when the effective piping measured value is greater than the sum of the set value and a set variation value.

7. The method of claim 2, wherein the rotation speed of the air fan device is regulated according to a direct ratio relationship with a value between a piping measured value variation and a unit time when the effective piping measured value is smaller than or equals to the sum of the set value and a set variation value, or greater than the set value.

8. The method of claim 2, wherein the air fan device rotates at a maximum speed when the effective piping measured value is smaller than a set measured value.

9. The method of claim 1, wherein the effective piping measured value is a minimum piping measured value corresponding to the equipment to serve as the basis for operation of the air fan device when the operation mode is heating.

10. The method of claim 9, wherein the corresponding adjustable air vent is fully opened when the piping measured value corresponding to the equipment is smaller than the difference of the set value subtracting a set variation value.

11. The method of claim 9, wherein the corresponding adjustable air vent is adjusted and opened according to an inverse ratio relationship with a value between a piping measured value variation and a unit time when the piping measured value corresponding to the equipment is greater than or equals to the difference of the set value and a set variation value, and the piping measured value is smaller than or equals to the set value.

12. The method of claim 9, wherein the corresponding adjustable air vent is opened at a minimum degree when the piping measured value corresponding to the equipment is greater than the set value.

13. The method of claim 9, wherein the air fan device rotates at a maximum speed when the effective piping measured value is smaller than the difference of the set value subtracting a set variation value.

14. The method of claim 9, wherein the rotation speed of the air fan device is regulated according to an inverse ratio relationship with a value between a piping measured value variation and a unit time when the effective piping measured value is greater than or equals to the difference of the set value and a set variation value, and the effective piping measured value is smaller than or equals to the set value.

15. The method of claim 9, wherein the air fan device rotates at a minimum speed when the effective piping measured value is greater than the set value.

* * * * *